United States Patent [19]

Bodenmiller

[11] Patent Number: 4,834,357

[45] Date of Patent: May 30, 1989

[54] WORKPLACE FOR THE TREATMENT, IN PARTICULAR, OF DENTAL WORKPIECES

[75] Inventor: Anton Bodenmiller, Leutkirch, Fed. Rep. of Germany

[73] Assignee: Kaltenbach & Voigt GmbH & Co., Biberach an der Riss, Fed. Rep. of Germany

[21] Appl. No.: 147,623

[22] Filed: Jan. 22, 1988

Related U.S. Application Data

[60] Continuation of Ser. No. 885,869, Jul. 15, 1989, abandoned, which is a division of Ser. No. 693,280, Jan. 22, 1985, abandoned.

[51] Int. Cl.$^4$ .............................................. B23Q 3/00
[52] U.S. Cl. ............................ 269/289 R; 248/118; 312/209; 51/273
[58] Field of Search ............ 269/11, 289 R; 354/290, 354/291; 108/23, 28; 248/118, 118.1, 447; 312/196, 209; 51/273

[56] References Cited

U.S. PATENT DOCUMENTS

| | | | |
|---|---|---|---|
| 147,594 | 2/1874 | Bird | 354/290 |
| 1,644,441 | 10/1927 | O'Brien | 248/118.1 |
| 2,449,492 | 9/1948 | Long | 248/447 |
| 2,827,553 | 3/1958 | Riches | 354/290 |
| 3,010,774 | 11/1961 | Doherty | 312/209 |
| 3,808,750 | 5/1974 | Mann | 51/273 |
| 4,372,659 | 2/1983 | Ogawa | 354/290 |

FOREIGN PATENT DOCUMENTS

| | | |
|---|---|---|
| 264708 | 9/1968 | Austria . |
| 1291440 | 3/1969 | Fed. Rep. of Germany . |
| 7736347 | 9/1978 | Fed. Rep. of Germany . |

Primary Examiner—Frederick R. Schmidt
Assistant Examiner—Judy J. Hartman
Attorney, Agent, or Firm—Scully, Scott, Murphy & Presser

[57] ABSTRACT

A workplace for the treatment or finishing of, in particular, dental workpieces; for instance, impressions, dentures, plastic teeth, or respectively artificial teeth, and the like. Furthermore, the workpiece can also serve for the finishing of jewelry workpieces or the like by goldsmiths. An artificial background is used for the workplace in which there is clarified the coloration or, in essence, the color distinctions of the workpieces which are to be treated, through the avoidance of disturbing optical influences.

1 Claim, 2 Drawing Sheets

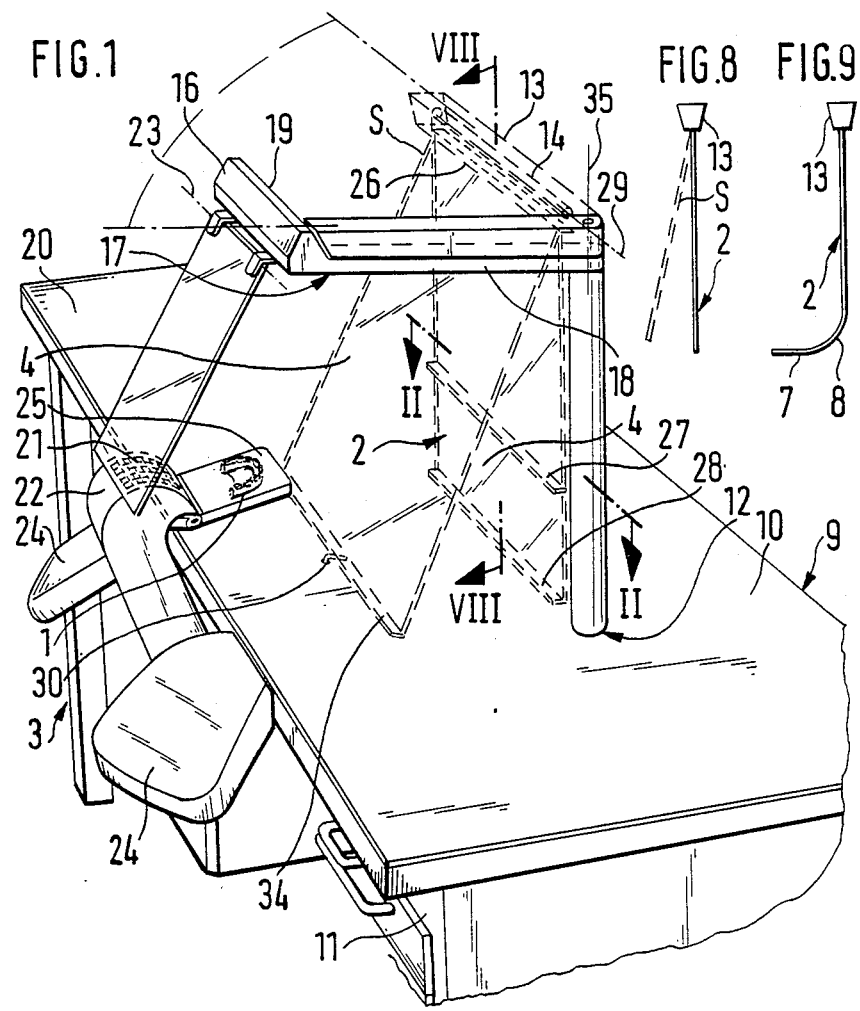
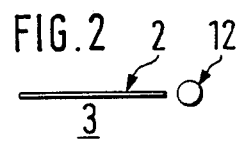
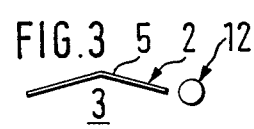
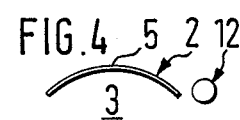
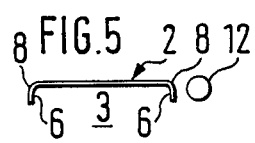
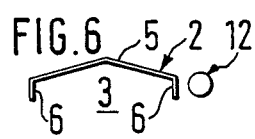
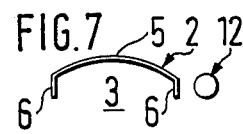

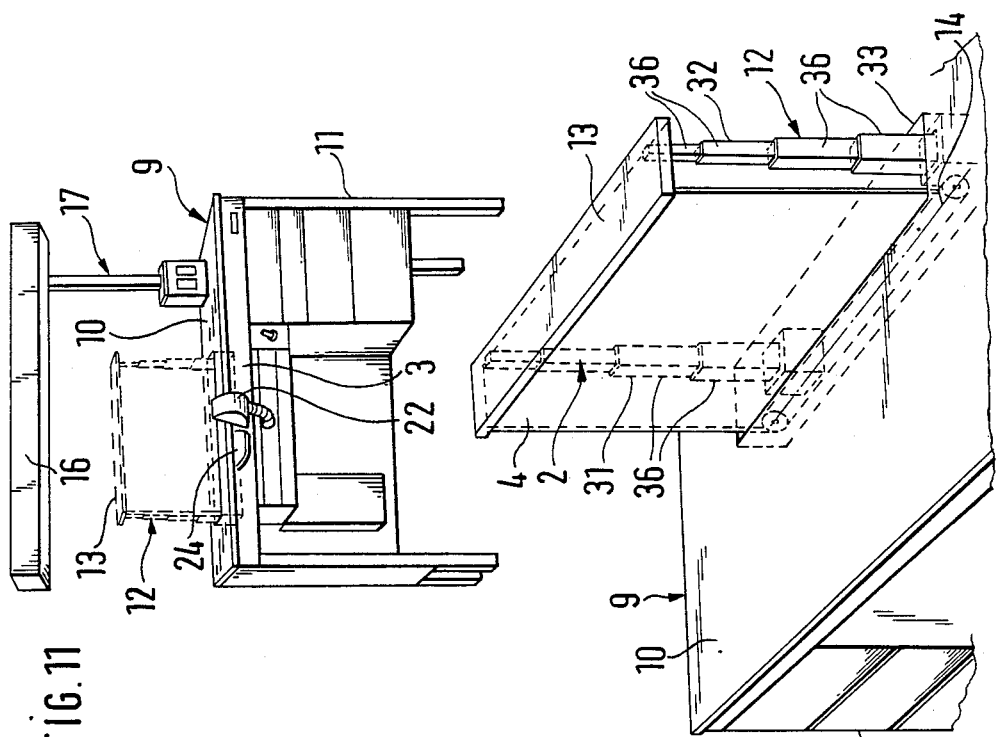
FIG.11
FIG.12
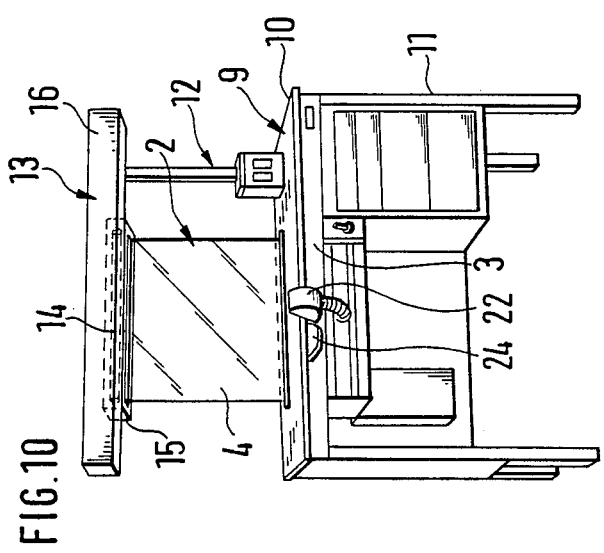
FIG.10

WORKPLACE FOR THE TREATMENT, IN PARTICULAR, OF DENTAL WORKPIECES

This application is a continuation, of application Ser. No. 885,869, filed July 15, 1986 now abandoned; and which is a division of Ser. No. 693,280, filed 1/22/85, now abandoned.

BACKGROUND OF THE INVENTION

1. Field of the Invention

The present invention relates to a workplace for the treatment or finishing of, in particular, dental workpieces; for instance, impressions, dentures, plastic teeth, or respectively artificial teeth, and the like. Furthermore, the workplace can also serve for the finishing of jewelry workpieces or the like by goldsmiths.

2. Discussion of the Prior Art

A workplace or location of the type as discussed hereinabove, has become known from the disclosure of German Petty Patent No. 77 36 347. This known workplace, which is integrated with a workplate formed by the table top of a work table is subject to the optical influence of a large number of shapes and colors from objects which are present in the room, and also by room walls or windows. Independently of the hereby encountered disturbing light reflections which occur especially with artificially illuminated workplaces, the person working at the workplace is hindered or distracted by the above-mentioned influences, and namely, especially just in the accurate observation of the object or workpiece; for example, during blending and ceramic working with false or artificial teeth wherein, as is known, fine color nuances are of importance.

SUMMARY OF THE INVENTION

The invention is distinguished through the utilization of an artificial background for a workplace in which there is clarified the coloration or, in essence, the color distinctions of the workpieces which are to be treated by eliminating the above-mentioned disadvantages encountered in the prior art workplaces, through the avoidance of disturbing optical influences.

The advantages which are achieved by the present invention can be ascertained in that through the artificial background there is formed a practically optically neutral environment or surroundings so as to avoid any optical hindrances or distractions tending to burden the person working at the workplace.

BRIEF DESCRIPTION OF THE DRAWINGS

Reference may now be had to the following detailed description of exemplary embodiments of the invention, taken in conjunction with the accompanying drawings; in which:

FIG. 1 illustrates a perspective view of a workplace with an artificial background;

FIG. 2 illustrates a sectional view on a reduced scale taken along line II—II in FIG. 1;

FIGS. 3 through 7 illustrate, respectively, modified embodiments with respect to that shown in FIG. 2;

FIG. 8 illustrates a sectional view taken along line VIII—VIII in FIG. 1;

FIG. 9 illustrates a modified embodiment with respect to that shown in FIG. 8; and FIGS. 10, 11, and 12, respectively, illustrate modified embodiments in comparison with that shown in FIG. 1.

DETAILED DESCRIPTION

The workplace which serves for the treatment or finishing of dental workpieces 1 possesses an artificial background 2 for the clarifying or distinguishing of the coloration or the color distinctions of the workpiece 1 which is to be treated or finished. The artificial background 2 produces an optically neutral surrounding at the workplace 3. For this purpose, the coloration of the artificial background 2 is simulative of daylight at least on the side of the surface facing towards the workplace 3. Thus, the artificial background 2 can possess a white or a gray, for example, light gray to medium gray coloration.

The artificial background 2 is constructed as an essentially upright standing wall 4 and is preferably flat. In accordance with the lighting conditions reigning at the workplace 3, the wall 4, pursuant to FIGS. 3 through 7, can also possess a convexity 5 extending away from the workplace 3. The convexity 5, as viewed from above, pursuant to FIGS. 3 and 6 has the shape of a shallow V, and pursuant to FIGS. 4 and 7 has the shape of a shallow U.

In the embodiments pursuant to FIGS. 5 through 7, the artificial background 2 possesses side segments 6 which extend essentially towards the workplace 3. In the embodiment pursuant to FIG. 9, the artificial background 2 possesses a lower segment 7 extending essentially towards the workplace 3. The construction pursuant to FIGS. 5 and 9 is such that the two side segments 6 and, respectively, the lower segment 7 extend with a rounded off portion or curvature 8 into the remaining portion of the artificial background 2.

Suitably, the artificial background 2 is movable from an operative position into an inoperative position. For this purpose, the wall 4 can be constructed as a foldable wall, a sliding wall, a tiltable wall or, as illustrated, a roll-up wall, for instance constructed as a wall which is rolled up in the form of a roller shade. A wall 4 which is tilted about an upper horizontal axis 29 into an inclined positions relative to the workplace 3 is illustrated in FIGS. 1 and 8 with phantom lines. For the locking into position of the tilted artificial background, there are provided latching means 30 on worktable 9, pursuant to FIG. 1.

The artificial background 2 can be fastened on a furniture piece; for instance, supported or fastened on a cabinet; however it can also be fastened to or supported on a ceiling, a wall, or on the floor of a room. In the illustrated embodiments, the artificial background 2 is associated with a work plate 9 integrated with the workplace 3, and supported on the work plate, wherein the work plate 9 is formed by the table top 10 of a worktable or bench 11. The artificial background 2 is carried by a support stand 12, which is arranged on the table top 10 of the worktable 11, and which is formed as a type of vertically extending column. The thus formed columnar support 12 possesses a carrying arm 13 to which there is fastened the artificial background 2. Arranged on the carrying arm 13 is a roller shade axle 14 for the fastening of the artificial background 2 which is formed as a roller shade wall. The roller shade axle 14 is arranged on a box-like receiver element 15 arranged on the carrying arm 13.

The inventively desired effect is still further enhanced when a worklight 16 is provided on the carrying arm 13 facing in a direction towards the workplace 3 in front of the artificial background 2. In order, for example, to obtain a desired larger distance between the light and the background, in accordance with FIG. 11 there can be provided in the direction towards the workplace 3 ahead of the artificial background 2 a worklight 16 on a separate support 17 or, alternatively, in accordance with FIG. 1, the separate support 17 can consist of a second carrying arm 18 on the columnar support 12 of the artificial background 2, wherein the worklight 16 is associated with an angled extension 19 of the second carrying arm 18. The two carrying arms 13 and 18 extend essentially horizontal, as well as the worklight or lamp 16.

Arranged on a separate support, or as illustrated in FIG. 1, on the second carrying arm 18, is a protective plate or shield 20 associated with the workplace 3, which suitably consists of a transparent material, for example glass, in particular dual-safety glass.

The embodiments pursuant to FIGS. 1, 10 and 11 possesses a suctioning device 22 which includes a suctioning opening 21 for the aspiration of suctionable material which is encountered during the finishing of workpieces, wherein the protective plate 20 is arranged in a position for which conducting the suctionable material into the suctioning opening 21, and which protects the face of the person working at the workplace from the suctionable material. The suctionable material, for example of filings, grinding dust or the like. The protective plate 20 is movable from its position in which it conducts the suctionable material into the suctioning opening 21, into an inoperative position which is distanced from the suctioning device 22. For this purpose, the protective plate 20 is pivotable about a horizontal pivot axis 23.

The suctioning device 22 is arranged on the worktable 11, the latter of which also incorporates arm rests 24 associated with the workplace 3, wherein one arm rest is provided on, respectively, each side of the suctioning device 22, or respectively, of the workplace 3. The suctioning device 22 also possesses a work block 25 as a support surface for the workpiece 1 which is to be treated or finished.

As is illustrated in FIG. 1, the artificial background 2 which is formed as a roller shade wall is lockable in different extended lengths 26, 27, 28.

In the embodiments pursuant to FIGS. 1 and 10, the columnar support 12 is arranged at one of the two vertical side edges of the artificial background 2.

In the embodiments pursuant to FIGS. 11 and 12, the columnar support 12 consists of two individual columns 31, 32. Arranged along both vertical side edges of the artificial background 2, is respectively, one of the individual columns, wherein the carrying arm 13, which spans the distance between the individual columns, is presently supported on the upper end of the two individual columns. The two individual columns are constructed as telescoping rods which, in the telescoped position are retracted together with the artificial background 2, into the worktable top 9. The telescoping elements of the telescoping rods are designated by the reference numeral 36. Ascertainable in particular from FIG. 11 is that also carrying arm 13 can be retracted into the work plate 9, and in the retracted position has its upper surface, while covering the remaining retracted components, coextensive with the surface of the worktable top 9. The worktable top 9 has associated therewith a recess 33 for receiving the artificial background 2, the telescoping rod or rods, and when required the carrying arm 13, in the retracted position thereof.

In the configuration of the artificial background 2 as a roller shade wall, arranged within the recess 33 is a roller shade axle 14 which is connected with the roller shade, and the roller shade can be pulled upwardly out of the recess 33 by rolling of the roller shade axle 14. Hereby, guides can be associated with the sides of the roller shade, for example, on the individual columns 31 and 32. In order to render the pulling out of the shade easier, the roller shade wall which forms the artificial background 2 can possesses a grip or a pulling bar 34.

It is purposeful when the columnar support 12 is rotatable about the vertical column axis 35. However, as is illustrated in FIG. 1, the carrying arm 13 supporting the artificial background 2, and/or the second carrying arm 17 which carries the worklamp 16 can be rotatable about the column axis 35 of the columnar support.

What is claimed is:

1. A workplace for effectuating a treatment or finishing of workpieces, in particular dental workpieces, comprising a vertical columnar support arranged on a horizontal work surface; a carrying arm mounted on an upper end of said columnar support; means for providing an artificial background for clarifying the coloration or color disinctions of the workpiece which is being treated including a tiltable wall being fastened to said carrying arm so as to be tiltable about a horizontal axis, which is parallel to a portion of the carrying arm, towards and away from said workplace, said tiltable wall having a coloration on at least a surface thereof facing towards the workplace which is in the spectrum between white and medium gray; and fastening means attached to said wall for restraining said tiltable wall in predetermined tilted positions thereof, relative to said horizontal work surface.

* * * * *